No. 811,697. PATENTED FEB. 6, 1906.
J. E. CASSERLY.
BOLTWORK FOR CIRCULAR DOORS.
APPLICATION FILED APR. 11, 1905.

UNITED STATES PATENT OFFICE.

JOSEPH E. CASSERLY, OF NEW YORK, N. Y., ASSIGNOR TO REMINGTON AND SHERMAN COMPANY, OF PHILADELPHIA, PENNSYLVANIA.

BOLTWORK FOR CIRCULAR DOORS.

No. 811,697.     Specification of Letters Patent.     Patented Feb. 6, 1906.

Application filed April 11, 1905. Serial No. 254,981.

*To all whom it may concern:*

Be it known that I, JOSEPH E. CASSERLY, a resident of New York, in the county of New York and State of New York, have invented certain new and useful Improvements in Boltwork for Circular Doors; and I do hereby declare the following to be a full, clear, and exact description of the invention, such as will enable others skilled in the art to which it appertains to make and use the same.

My invention relates to improvements in boltwork for circular doors, the object of the invention being to provide a circular door having a series of radially-disposed bolts with improved mechanism for simultaneously moving all the bolts either inward or outward; and the invention consists in certain novel features of construction and combinations and arrangements of parts, as will be more fully hereinafter described, and pointed out in the claims.

Figure 1:
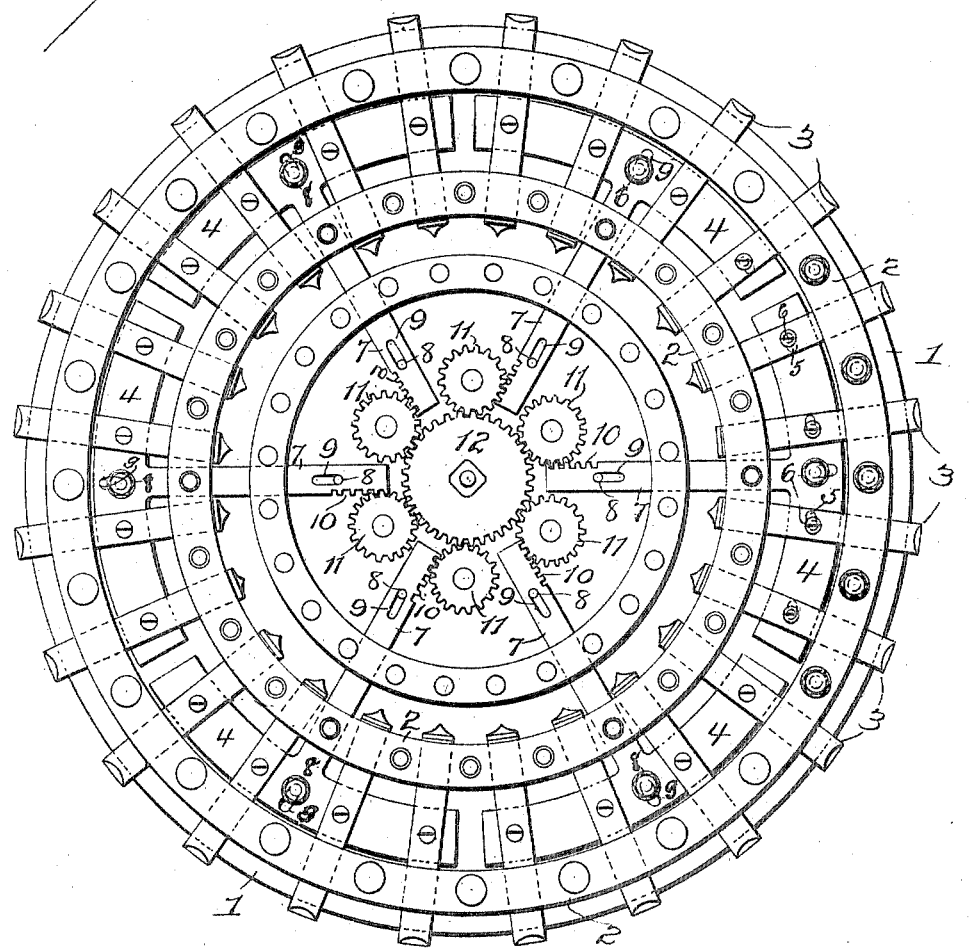
Figure 2:
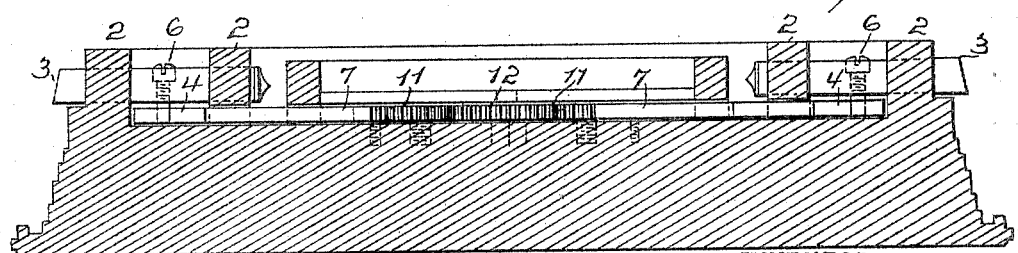

In the accompanying drawings, Figure 1 is a view in elevation, illustrating my improvements; and Fig. 2 is a view in section thereof.

1 represents the door, to which parallel fixed rings 2 are secured and provided with alined openings to receive the radially-disposed bolts 3, located all around the door. Beneath the bolts 3 between rings 2 a series of bars or segments 4 are located, and each segment is provided beneath its bolts with slots 5 to receive screws or pins 6, carried by the bolts. Slots are provided to receive the pins or screws, for the reason that when the bolts are drawn inward said pins approach each other owing to the radial arrangement of the bolts, and when the bolts are moved outward the pins move away from each other.

Each bar or segment 4 is provided centrally with an inwardly-projecting arm 7, and the movement of the bar or segment and arm are limited by pins or bolts 8 in slots 9, as clearly shown. The inner ends of these arms 7 are toothed, forming racks 10, each engaged by a pinion 11 and all the pinions 11 in mesh with a central driving-pinion 12, so that when the latter is turned all the pinions 11 will be simultaneously turned to move arms 7, segments 4, and bolts 3 either inward or outward, as the case may be. The pinions 11 and 12 are mounted on the door.

Slight changes might be made in the general form and arrangement of the parts described without departing from my invention, and hence I would have it understood that I do not restrict myself to the precise details set forth, but consider myself at liberty to make such slight changes and alterations as fairly fall within the spirit and scope of my invention.

Having fully described my invention, what I claim as new, and desire to secure by Letters Patent, is—

1. The combination with a door and a series of radially-disposed bolts thereon, of a series of bars or segments each movably connected with a plurality of bolts, pinions for moving the segments and a pinion controlling all of the first-mentioned pinions.

2. The combination with a door and a series of radially-disposed bolts thereon, of a series of bars or segments each movably connected with a plurality of bolts and provided with an arm having rack-teeth, pinions engaging said racks, and means for simultaneously turning said pinions.

3. The combination with a door, and radially-disposed bolts thereon, of segments, each segment movably connected with a number of bolts, inwardly-projecting arms on the segments having gear-teeth thereon forming racks, pinions engaging said racks, and a central pinion in mesh with all of said first-mentioned pinions.

In testimony whereof I have signed this specification in the presence of two subscribing witnesses.

JOSEPH E. CASSERLY.

Witnesses:
 FRANK O. HERRING,
 RUTHERFORD S. FOWLER.